US008928271B2

(12) United States Patent
Bucella et al.

(10) Patent No.: US 8,928,271 B2
(45) Date of Patent: Jan. 6, 2015

(54) METHOD AND APPARATUS TO CONVERT A MINIMALLY CONTROLLED PULSE STREAM INTO A PROPER MECHATRONIC TRAJECTORY

(71) Applicant: Teknic, Inc., Pittsford, NY (US)

(72) Inventors: Thomas John Bucella, Rochester, NY (US); David W. Sewhuk, Rochester, NY (US); Scott M. Mayne, Webster, NY (US)

(73) Assignee: Teknic, Inc., Pittsford, NY (US)

( * ) Notice: Subject to any disclaimer, the term of this patent is extended or adjusted under 35 U.S.C. 154(b) by 154 days.

(21) Appl. No.: 13/790,926

(22) Filed: Mar. 8, 2013

(65) Prior Publication Data

US 2014/0077749 A1    Mar. 20, 2014

Related U.S. Application Data

(60) Provisional application No. 61/701,163, filed on Sep. 14, 2012.

(51) Int. Cl.
*H02P 8/00* (2006.01)
*H02P 8/38* (2006.01)
*H02P 8/36* (2006.01)

(52) U.S. Cl.
CPC .. *H02P 8/38* (2013.01); *H02P 8/36* (2013.01); *Y10S 388/912* (2013.01)

USPC ...... 318/696; 318/685; 318/400.01; 318/721; 318/799; 388/800; 388/912

(58) Field of Classification Search
CPC .. G05B 19/231; G05B 19/251; G05B 19/416; G05B 2219/37388; G05B 2219/41245
USPC ............ 318/696, 685, 560, 561, 721, 400.01, 318/400.4, 799; 388/800, 842, 912
See application file for complete search history.

(56) References Cited

U.S. PATENT DOCUMENTS

| 3,506,859 | A |   | 4/1970  | Snowden |
|-----------|---|---|---------|---------|
| 4,153,866 | A |   | 5/1979  | Leenhouts |
| 5,847,535 | A | * | 12/1998 | Nordquist et al. ............ 318/700 |
| 5,914,580 | A | * | 6/1999  | Senoh .......................... 318/696 |

* cited by examiner

*Primary Examiner* — Antony M Paul
(74) *Attorney, Agent, or Firm* — Brown & Michaels, PC (57) ABSTRACT

An apparatus or method which accepts a burst of pulses at a frequency which may not be tightly controlled and converts this into a trajectory command that is a suitable motion profile for an incremental motor control application. The output of the invention can be a pulse stream that can be fed to an existing incremental pulse input motor drive or the invention can be embedded into a motor drive where its output is a numerical sequence that defines a physically realizable trajectory to be fed to the control circuits and software within the motor drive.

8 Claims, 7 Drawing Sheets

Figure 1. (Prior Art)

Figure 2. Ramped Step Pulse (Prior Art.)

Figure 3. (Prior Art)

Figure 4. Mechatronic Axis Control System (Prior Art)

METHOD AND APPARATUS TO CONVERT A MINIMALLY CONTROLLED PULSE STREAM INTO A PROPER MECHATRONIC TRAJECTORY

REFERENCE TO RELATED APPLICATIONS

This application claims one or more inventions which were disclosed in Provisional Application No. 61/701,163, filed Sep. 14, 2012, entitled "METHOD AND APPARATUS TO CONVERT A MINIMALLY CONTROLLED PULSE STREAM INTO A PROPER MECHATRONIC TRAJECTORY". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of control systems. More particularly, the invention pertains to signal converters for mechatronic control systems.

2. Description of Related Art

In automated mechatronic systems the precise positioning of mechanical loads is predominantly accomplished in small increments of position resolution, i.e., the positioning subsystem has target positions that are quantized such that it can only stop at these quantized positions. These systems are referred to in the art as incremental motor control systems.

The earliest system of this type to gain popularity were systems based upon stepper motors, where the electro-mechanical design of the motor creates natural incremental stopping points that can be transitioned to by cycling or "stepping" current through the motor phase windings, each increment in a phase winding current cycle leading to another incremental step of the output shaft angle, see U.S. Pat. No. 3,506,859. If one desires to move from point A to point B, some incremental number of steps away from point A, the phase winding current cycle simply needs to be repeated the appropriate number of times based upon the distance between A and B. However, the current in the motor phase windings can not be arbitrarily cycled to move from point A to point B without any respect to the timing of the motor phase winding current cycles. These cycles need to be precisely timed in order for the system to operate properly.

Figure 1:
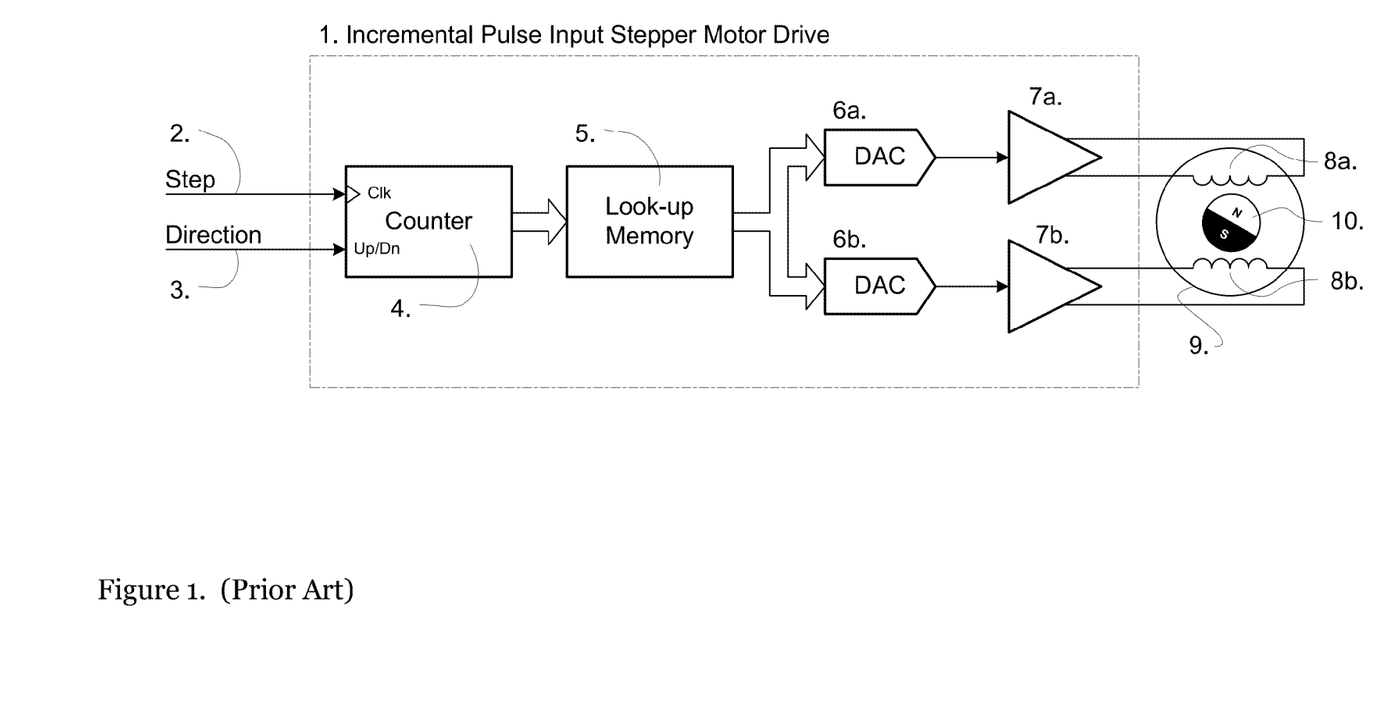
FIG. 1 shows a block diagram of a prior art incremental pulse input stepper motor drive.

An evolution of the stepper motor control system that made it more usable to a wider audience was the introduction of the incremental pulse input stepper motor drive that would advance the motor phase winding current cycle one incremental step for each pulse that was provided to one of its inputs while another input was used to control the direction of motor phase current cycle to cause forward or reverse motion, see prior art FIG. 1 of this application, also U.S. Pat. No. 4,153,866. (Alternate input formats include one input for a forward pulse and another for a reverse pulse, etc.). These incremental pulse input stepper motor drives removed the machine control system of the need to calculate, deliver and control the current in the stepping motor's phase windings to increment the shaft position. The timing of the incremental pulses sent to the incremental pulse input stepper drive's inputs, however, is still important for proper operation of the motor control system. These incremental pulses need to be ramped up and down smoothly in frequency in order to have error free and smooth operation of the motor.

FIG. 1 shows a block diagram of such a prior art system using an incremental pulse input stepper motor drive 1, where a counter or state machine 4 is driven though states by the incremental pulse inputs Step 1 and Direction 2. The output of this counter 4 indexes look-up memory 5 whose output values are used to set the current in the phase windings 8a & 8b via digital-to-analog converters 6a and 6b and transconductance amplifiers 7a and 7b.

As the state-of-the-art advanced, systems were developed that retained the input interface of the stepper motor drive, i.e., the incremental pulse input described above, but were constructed to drive motors which were not stepper motors (i.e., to drive motors that do not have the natural electromagnetic stopping points). These alternate motors provide increased performance when coupled with a feedback device to form a closed-loop servo motor system. In these closed-loop motor drive systems the incremental pulse input is sent to a counter whose output becomes the reference for the servo control loops.

Figure 3:
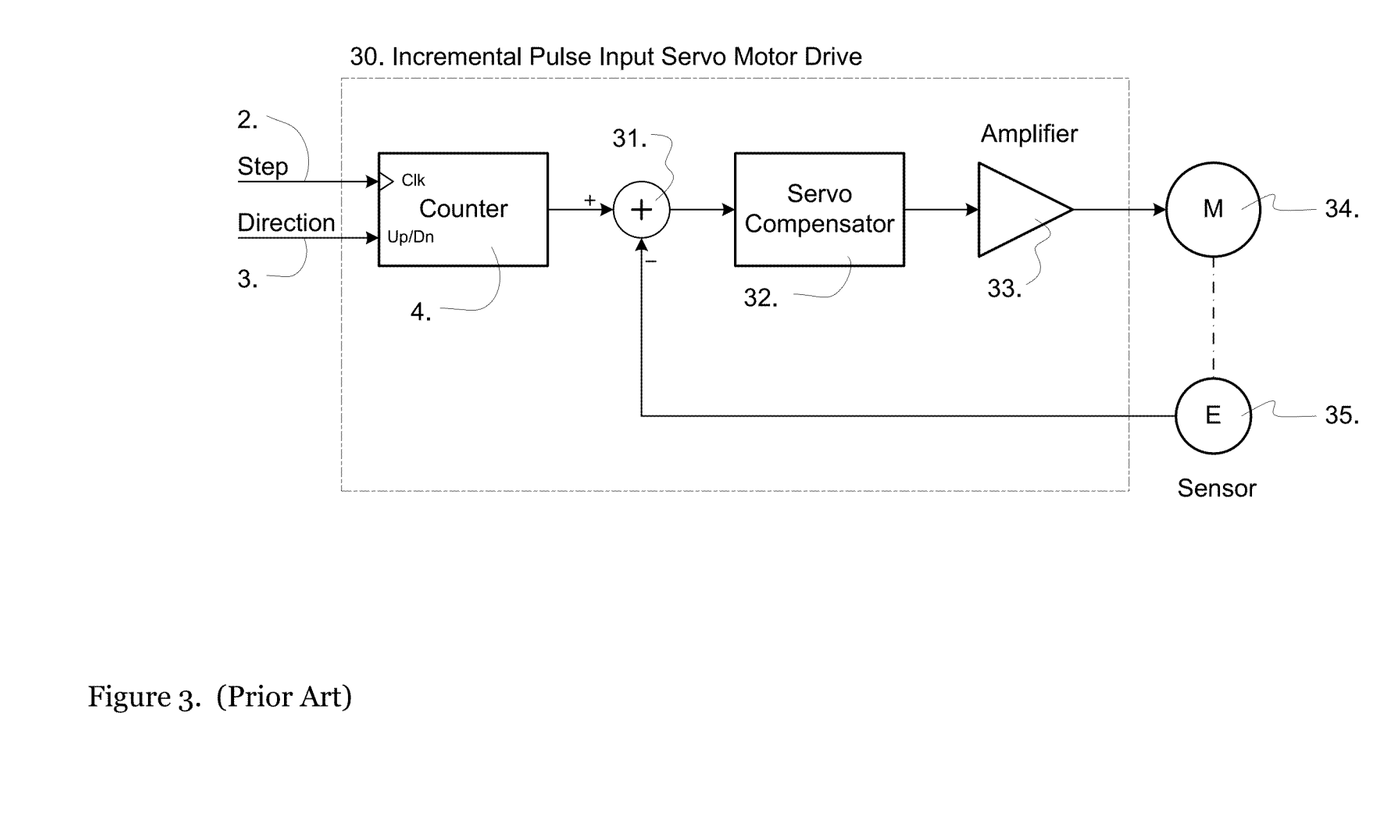
FIG. 3 shows a block diagram of a prior art incremental pulse input servo motor drive.

Prior art FIG. 3 shows an incremental pulse input servo motor drive 30 where a position counter 4 is incremented/decremented by incremental pulse inputs Step 1 and Direction 2. The output of this counter 4 becomes the position reference for a servo control system comprised of a summing node 31, servo compensator 32, an amplifier 33, motor 34 and sensor 35.

Figure 2:
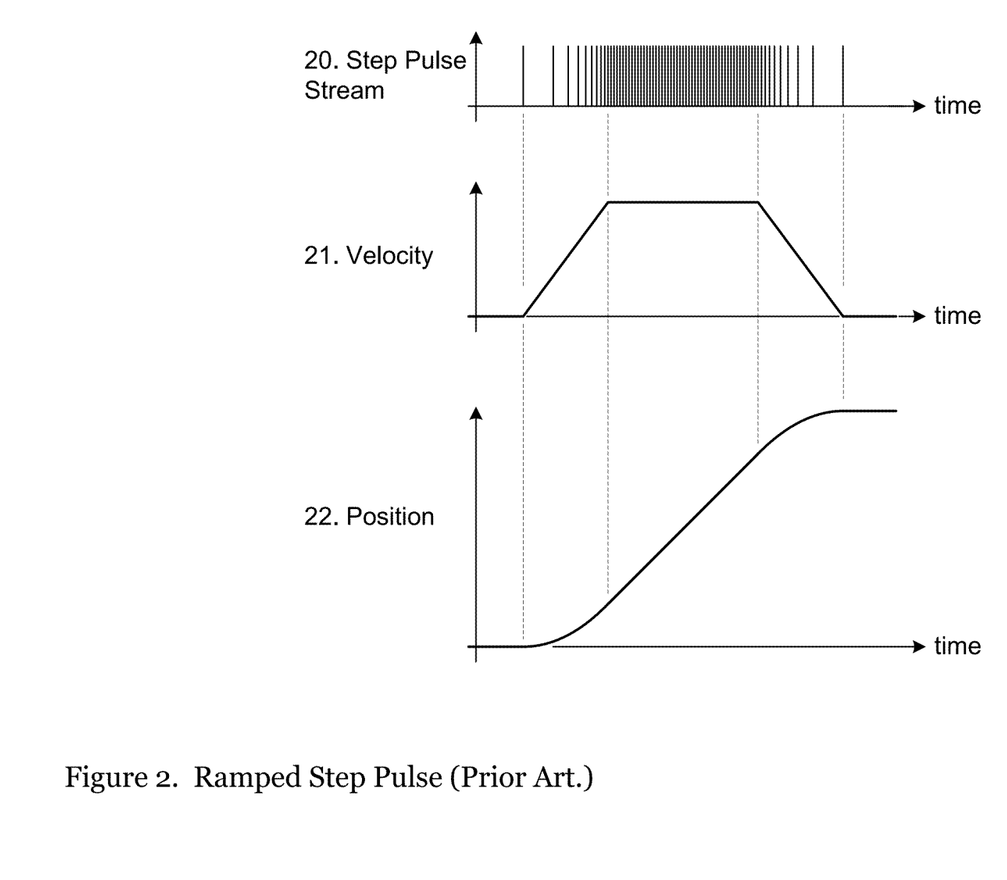
FIG. 2 shows graphs of step pulse stream, velocity and position in a prior art ramped step pulse system.

Prior art FIG. 2 shows a frequency controlled pulse stream 20 as required for use with a prior art incremental pulse input stepper motor drive (as in FIG. 1) or a prior art incremental pulse input servo motor drive (as in FIG. 3). Resultant velocity vs. time 21 and position vs. time 22 graphs are also shown.

Due to wide adoption and familiarity with the incremental pulse input method, incremental pulse input motor drives are very popular and low cost, both those that drive stepper motors as well as those that drive servo motors. Although servo motor drives with an incremental pulse input offer increased performance over the stepper motor based systems, the physics of these systems still require that the timing of the incremental input pulses be precisely controlled for smooth and error-free motion.

In mechatronic machine systems the timing of the incremental input pulses sent to these motor drives is precisely controlled by a trajectory generator or "indexer" subsystem. Trajectory generators create pulse sequences with precisely controlled frequency ramps during the starting and stopping portions of a move to control the acceleration and deceleration of the motion as shown in prior art FIG. 2.

Figure 4:
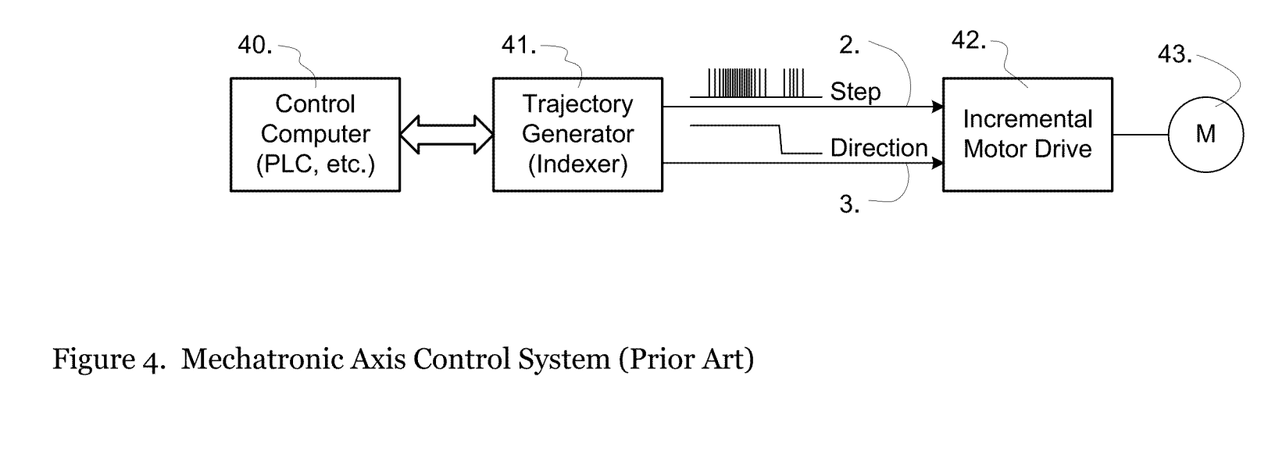
FIG. 4 shows a block diagram of a prior art mechatronic axis control system.

A trajectory generator produces an incremental pulse command sequence, similar to that shown at 20 in FIG. 2, in response to positioning demands from a control computer that is coordinating the incremental motion of the motors within the mechatronic machine. The structure of a mechatronic axis control system is shown in prior art FIG. 4, which shows a mechatronics axis control system with a incremental pulse input motor drive 42 of the prior art which requires the use of a trajectory generator 41 to control a motor 43.

Many control computers do not have built-in trajectory generators, especially low cost controllers such as micro-PLCs (Programmable Logic Controllers). Some control computers can have trajectory generators added to them at significant cost, or alternately, the trajectory generator function can be constructed with software running within the machine controller, but only with significant effort and often with significant limitations due to the precise timing/frequency ramping requirements.

SUMMARY OF THE INVENTION

It is straightforward for controllers to produce a burst of pulses (where the number of pulses in the burst defines the incremental distance of the required axis movement) where the burst is a fixed frequency, i.e., without the need to ramp (control the rate of change of) the pulse frequency nor the need to tightly control the frequency of the burst. The removal of the need to ramp the frequency or otherwise precisely control the frequency of the incremental pulse input sequence makes it easy to produce these sequences with the electronic hardware typically available within inexpensive controllers, or alternately, easy to create with software running within these controllers.

The invention presents an incremental pulse input positioning motor drive which includes a subsystem which creates smoothly ramped and precisely timed incremental move profiles from a burst of input pulses. A motor drive containing such a system would not require incremental pulse input sequences that are ramped in frequency to operate properly. Such a motor drive would lower the cost of the mechatronic control system where incremental point-to-point motion is required by facilitating the use of a lower cost control computer without specialized trajectory generator (indexer) peripherals.

The invention is an apparatus or method which accepts a burst of pulses at a frequency which may not be tightly controlled (where the number of pulses in the burst is proportional to the required move length) and converts this into a trajectory command that is a suitable motion profile for an incremental motor control application. The output of the invention can be a pulse stream that can be fed to an existing incremental pulse input motor drive or the invention can be embedded into a motor drive where its output is a numerical sequence that defines a physically realizable trajectory to be fed to the control circuits and software within the motor drive.

In addition to the incremental pulse input, the invention also accepts inputs that are the physical constraints of the motor, motor-drive an load of the system, the two most common of these being the maximum acceleration the system can reliably attain and the maximum velocity the system can reliably attain. Other constraints on the higher order time-derivatives of position vs. time could also be accepted as inputs, (e.g. jerk, the time-derivative of acceleration). Alternately, a more complicated version of the invention could accept maps of the constraints, e.g. acceleration limit versus velocity, etc. The invention then uses these constraints to modify the burst of pulses into a physically realizable trajectory that stays within the constraints defined by the constraint inputs, see FIG. 5.

DETAILED DESCRIPTION OF THE INVENTION

Figure 5:
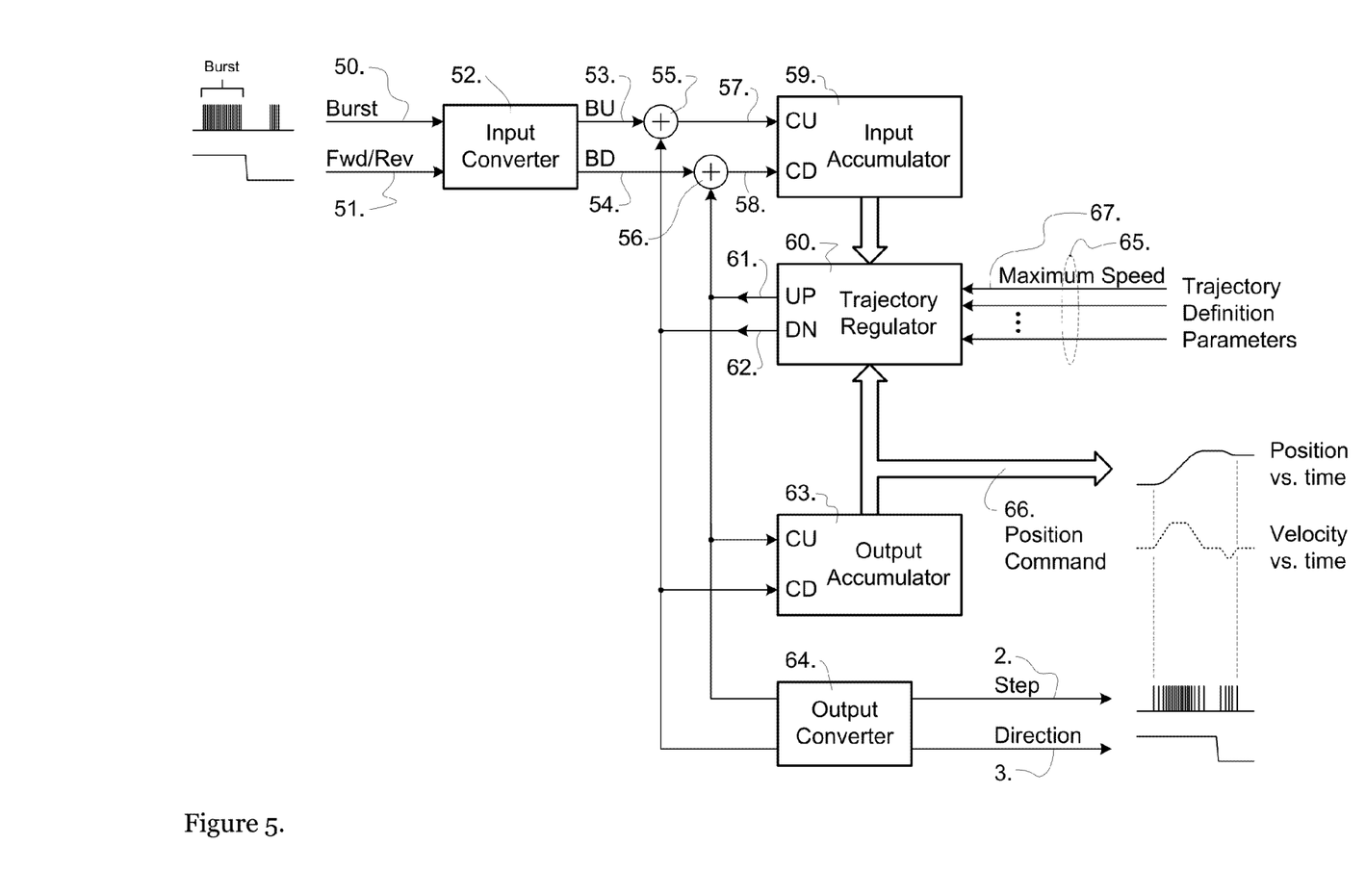
FIG. 5 shows a block diagram of the trajectory regulator subsystem of the invention.

FIG. 5 shows a block diagram of an embodiment of the invention shown converting a burst pulse input 50, into a proper position command 66 while also producing the equivalent ramped, frequency controlled incremental Step 2 and Direction 3 signal outputs.

The input to the system is formed by two signals which are provided by the upstream control computer Burst 50 and Fwd/Rev 51. The upstream machine controller sets the Fwd/Rev 51 signal to the intended direction of movement and then provides a stream of pulses to the Burst 50 input, one pulse for each incremental step or "quantum" of motion desired.

There are no constraints on the frequency of the pulse stream of the Burst 50 signal, except that they are above a Maximum Speed 67 as defined in the set of Trajectory Definition Parameters 65. This allows the Burst 50 to be created by the control computer with a basic digital output using simple software spin loop, an interrupt service routine or the output of a counter/timer (A counter/timer is a common hardware peripheral available on nearly all microcontrollers used as control computers for mechatronics control.)

The Input Converter 52 routes the Burst 50 signal to the BU 53 or BD 54 outputs depending upon the direction of the Fwd/Rev 51 signal. BU 53 and BD 54 are fed through summers 55 and 56 to the Input Accumulator 59. The Input Accumulator 59 is a count-up/count-down counter which stores the incoming pulses 57 and 58 less the outgoing move increments sent to the Output Accumulator 63 that are dispensed by the Trajectory regulator 60 as UP 61 and DN 62 signals; the cycling of the UP signal 61 increments the Output Accumulator 63 while decrementing the Input Accumulator 59; the cycling of the DN signal 62 decrements the Output Accumulator 63 while incrementing the Input Accumulator 59.

The Trajectory Regulator 60 creates the UP 61 or DN 62 pulses in order to essentially transfer counts from the Input Accumulator 59 to the Output Accumulator 63 whose count is the Position Output Command 66; the transferring of the count from the Input Accumulator 59 to Output Accumulator 63 is performed by the Trajectory Regulator 60 according to rules defined by the Trajectory Definition Parameters 65 until the count of the input Accumulator has been reduced to zero. By following the rules/constraints defined by the Trajectory Definition Parameters 65, the Trajectory Regulator 60 as it transfers counts from the Input Accumulator 59 to the Output Accumulator 63 produces a Position Output Command 66 which is a suitably controlled (shaped) move command reference for a motor control system (which has controlled acceleration, velocity, power, etc.).

So long at the Burst 50 input pulse stream has a frequency greater that the Maximum Speed 67 trajectory definition parameter, the Input Accumulator 59 will not be emptied by the Trajectory Regulator 60 until the Position Output Command has transitioned through a properly constrained move sequence because the rate of UP 61 or DN 62 is limited to be below the incoming rate of the Burst 50 input by definition.

It will be noted that the UP 61 or DN 62 signals are properly ramped in frequency so as to be used as incremental move signals to form the basis of a command for an Incremental Pulse Input Stepper Motor Drive 1 (FIG. 1.) or an Incremental Pulse Input Servo Motor Drive 30 (FIG. 3.). FIG. 5 shows an optional state machine Output Converter 64 which transforms the CU 61 and DN 62 signals into traditional Step 2 and Direction 3 signals for use with these incremental drives. (Some incremental motor drives accept signals in the form of UP 61 and DN 62 directly without this conversion.)

Figure 6:
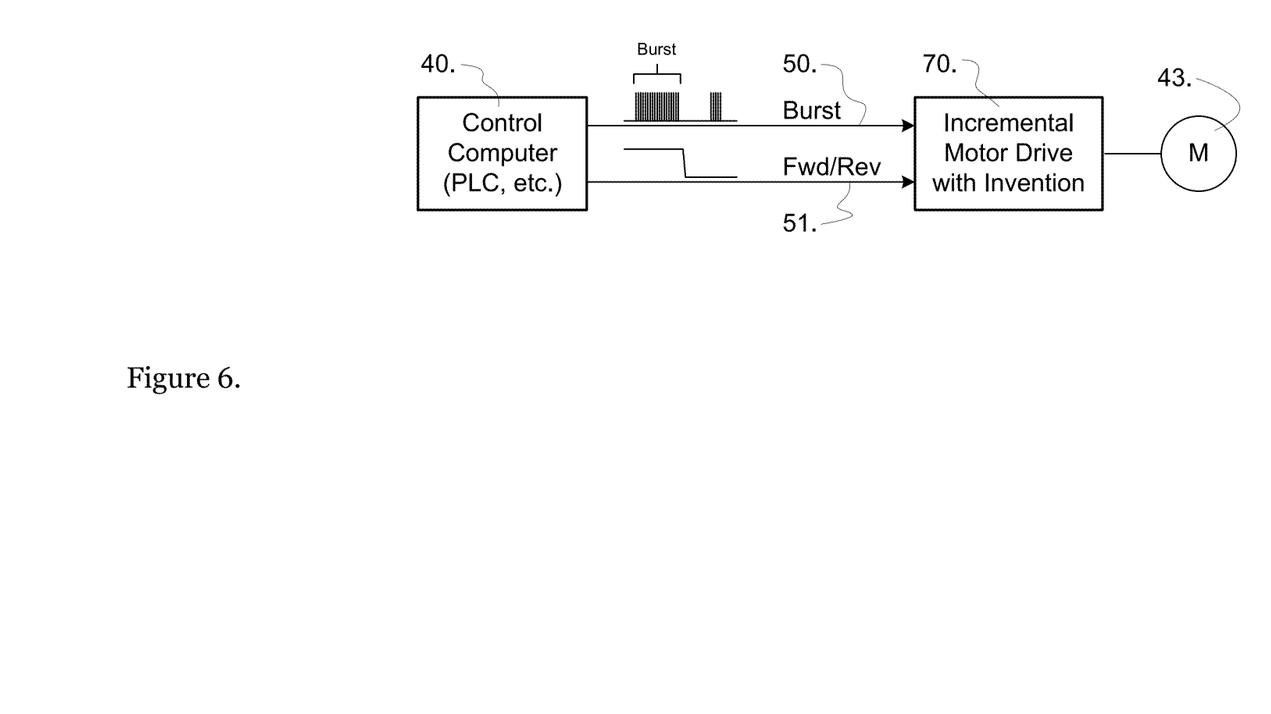
FIG. 6 shows a block diagram of the trajectory regulator subsystem of the invention used with a mechatronic axis control system.

FIG. 6 shows the reduction of complexity of a mechatronic axis control system when using the invention. The figure shows a mechatronics axis control system with a incremental pulse input motor drive that includes the invention 70 using a burst 50 command to control a motor 43 without the need of a trajectory generator. Contrasted to FIG. 4, the Trajectory Generator 41 (often referred to as an indexer) has been removed in FIG. 6. The Burst 50 and Fwd/Rev 51 signals are created easily using facilities existing within the Control Computer 40.

Figure 7:
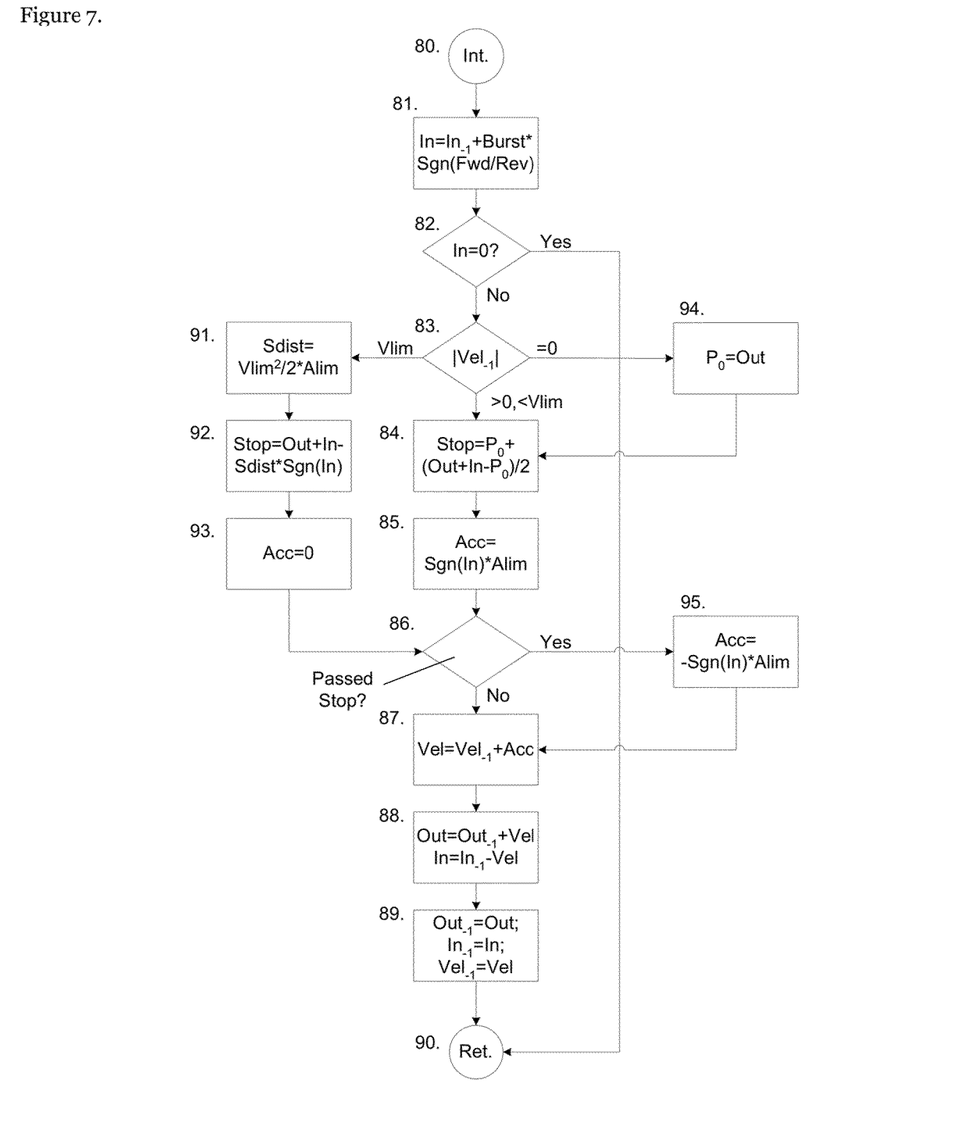
FIG. 7 shows a flowchart of the operation of the trajectory regulator subsystem of the invention.

FIG. 7 details a method which is an embodiment used to perform the functions of the Trajectory Regulator 60 shown in figure, in the form of a flowchart that describes a method used by an embodiment of a Trajectory Regulator (60, FIG. 5) which regulates the transfer of position increments from the Input Accumulator to the Output Accumulator such that the Acceleration and Velocity of the position sequence transferred is controlled.5. This method is shown as an interrupt service routine but could be implemented by someone skilled in the art as a continuous loop in software or completely in hardware or any mix of these.

The process begins with step 80 adding the signed count of Burst 50 pulses since the last interrupt to the Input Accumulator In, where the sign is determined by the state of the Fwd/Rev 51 signal.

The process continues with decision 81, if the value of the Input Accumulator 59 is zero then there is no work to be performed and the execution terminates by returning via 90.

If, alternately, the Input Accumulator 59 is non-zero, another decision 82 is performed on the absolute value of the velocity Vel.

If Vel is zero this indicates that this is the start of a new move sequence and step 94 is performed to store the value in the Output Accumulator Out into variable $P_0$ which then holds the move start position.

If the velocity Vel is non-zero this indicates that a move is in operation and decision 83 directs the operation to steps 91-93 if the velocity Vel has already reached maximum speed Vlim, or else, to steps 84-85 when the velocity Vel is below the maximum speed Vlim.

Steps 91-93 or 84-85 calculate Stop, the position to begin stopping using $P_0$, the Input Accumulator In and the Output Accumulator Out and also set the acceleration Acc used to increment velocity Vel when the Stop position has not been passed.

Decision 86 is then performed to test if the Stop position has been passed, if this is true, the acceleration Acc is set to decelerate in step 95, else no action is taken.

Operation is then passed to step 87 where the velocity Vel is calculated using the previous velocity Vel-1 and the acceleration Acc.

Step 88 then updates the Input Accumulator In and the Output Accumulator Out using the current velocity Vel and their previous values $Out_{-1}$ and $In_{-1}$ (i.e., the transferring of the count from the Input Accumulator 59 to Output Accumulator 63).

Step 89 copies the current values of the Input Accumulator In, the Output Accumulator Out and the velocity Vel to $In_{-1}$, $Out_{-1}$ and $Vel_{-1}$, respectively, in preparation for the next incremental operation of the method. Note that when the deceleration phase (when decision 86 is true and decision 83 yields zero) is complete, the Input Accumulator In will have been emptied so that subsequent iterations of this method will branch at decision 82 with no changes, at which time any previously running move will have been completed.

Accordingly, it is to be understood that the embodiments of the invention herein described are merely illustrative of the application of the principles of the invention. Reference herein to details of the illustrated embodiments is not intended to limit the scope of the claims which will be filed in a utility application claiming benefit from this provisional application, which will themselves recite those features regarded as essential to the invention.

What is claimed is:

1. A device comprising:
    an incremental pulse input for receiving incoming incremental pulses at an average rate;
    an input accumulator coupled to the incremental pulse input;
    a trajectory regulator for coupling to a motor, having an input coupled to the input accumulator, an output accumulator, and a position command output representing an accumulated value in the output accumulator; and
    a position command output coupled to the trajectory regulator;
    wherein:
        the input accumulator stores pulses received at the incremental pulse input;
        the trajectory regulator removes position increments from the input accumulator and adds them to a value in the output accumulator at an average rate below the average rate of the incoming incremental pulse input until the input accumulator becomes empty; and
        the position command output of the trajectory regulator, representing the value in the output accumulator, is used to command the motion of a motor.

2. The device of claim 1 integrated into a motor drive.

3. The device of claim 1 where the trajectory regulator limits the rate of change of transfer from the input accumulator and the output accumulator.

4. The device of claim 1 where the trajectory regulator begins transferring to the output accumulator immediately upon receipt of pulses on the incremental pulse input.

5. The device of claim 1 where the trajectory regulator begins adding to the output accumulator after a trigger is received from a separate source.

6. The device of claim one where the trajectory regulator begins adding to the output accumulator only after pulses on the incremental pulse input have ceased for a period of time.

7. The device of claim 1 where the incremental pulse input is comprised of at least one of the following: step and direction signals, a two phase quadrature input, a count-up/count down input pair, or count-up and count-down signals.

8. The device of claim 1 where the output is a series of incremental pulses generated by the operation of the trajectory regulator in at least one of the following formats: step pulses plus a direction signal, count-up pulses plus count-down pulses, a quadrature set of pulse signals.

* * * * *